US012656567B2

(12) United States Patent
    Chalk et al.

(10) Patent No.: US 12,656,567 B2
(45) Date of Patent: Jun. 16, 2026

(54) INTERMITTENTLY BONDED RIBBON WITH CONTINUOUS LENGTHWISE COATING

(71) Applicant: CORNING RESEARCH & DEVELOPMENT CORPORATION, Corning, NY (US)

(72) Inventors: Julie Ann Chalk, Hickory, NC (US); David Wesley Chiasson, Edmonton (CA); Gregory Alan Mills, Clemmons, NC (US); Bin Yang, Shenzhen (CN); Xiaomin Zhao, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 131 days.

(21) Appl. No.: 18/144,305

(22) Filed: May 8, 2023

(65) Prior Publication Data

US 2023/0273390 A1      Aug. 31, 2023

Related U.S. Application Data

(63) Continuation of application No. PCT/US2021/058709, filed on Nov. 10, 2021.
(Continued)

(51) Int. Cl.
    *G02B 6/44*          (2006.01)
(52) U.S. Cl.
    CPC ........... *G02B 6/448* (2013.01); *G02B 6/4482* (2013.01)
(58) Field of Classification Search
    CPC ............................. G02B 6/448; G02B 6/4482
(Continued)

(56) References Cited

U.S. PATENT DOCUMENTS

| 4,709,984 | A | * | 12/1987 | Oestreich | ............... | G02B 6/448 |
| | | | | | | 385/109 |
| 5,809,195 | A | * | 9/1998 | Brown | ................... | G02B 6/245 |
| | | | | | | 385/114 |

(Continued)

FOREIGN PATENT DOCUMENTS

| CN | 111837064 A | 10/2020 |
| EP | 2770357 A1 | 8/2014 |

(Continued)

OTHER PUBLICATIONS

Extended European Search Report, EP application No. 21895368.5, dated Sep. 27, 2024, 9 pages, European patent office.
(Continued)

*Primary Examiner* — Jerry M Blevins
(74) *Attorney, Agent, or Firm* — Thomas R. Irwin

(57)          ABSTRACT

Embodiments of the disclosure relate to an optical fiber ribbon. The optical fiber ribbon includes a plurality of optical fibers arranged adjacently to each other. Each optical fiber has a circumferential outer surface. The optical fiber ribbon also includes a lengthwise continuous coating disposed on at least a portion of the circumferential outer surface of each optical fiber. The coating includes a colorant for identifying the optical fiber ribbon among a plurality of optical fiber ribbons. The coating has a first thickness. Further, the optical fiber ribbon includes plurality of bonds intermittently formed between adjacent optical fibers of the plurality of optical fibers. Each of the bonds has a second thickness that is greater than the first thickness. The plurality of bonds provide the only connection between the adjacent optical fibers of the plurality of optical fibers.

21 Claims, 4 Drawing Sheets

Related U.S. Application Data

(60) Provisional application No. 63/115,780, filed on Nov. 19, 2020.

(58) Field of Classification Search
USPC ......................................................... 385/114
See application file for complete search history.

(56) References Cited

U.S. PATENT DOCUMENTS

| | | | |
|---|---|---|---|
| 9,086,555 B2 | 7/2015 | Namazue et al. | |
| 9,880,368 B2 | 1/2018 | Debban et al. | |
| 10,409,017 B2 | 9/2019 | Chiasson et al. | |
| 10,678,012 B1* | 6/2020 | Wu ........................ | G02B 6/562 |
| 11,256,056 B2 | 2/2022 | Isaji et al. | |
| 2006/0039658 A1 | 2/2006 | Furuyama et al. | |
| 2013/0279866 A1 | 10/2013 | Wells et al. | |
| 2015/0049997 A1* | 2/2015 | Isaji ..................... | G02B 6/4403 |
| | | | 385/114 |
| 2016/0070079 A1* | 3/2016 | Sajima ................. | G02B 6/4404 |
| | | | 385/114 |
| 2017/0029991 A1* | 2/2017 | Chandrasekaran ..... | B32B 5/142 |
| 2017/0115461 A1 | 4/2017 | Namazue et al. | |
| 2017/0242209 A1 | 8/2017 | Tachibana et al. | |
| 2017/0299829 A1* | 10/2017 | Hoshino ............ | G02B 6/44384 |
| 2019/0250347 A1 | 8/2019 | Fallahmohammadi et al. | |
| 2019/0317289 A1 | 10/2019 | Sekine et al. | |
| 2019/0369343 A1* | 12/2019 | Chalk .................. | G02B 6/4411 |
| 2020/0400903 A1 | 12/2020 | Tanaka et al. | |

FOREIGN PATENT DOCUMENTS

| | | |
|---|---|---|
| WO | 2017/122665 A1 | 7/2017 |
| WO | 2018/006160 A1 | 1/2018 |

OTHER PUBLICATIONS

International Search Report and Written Opinion of the International Searching Authority; PCT/US2021/058709; dated Feb. 7, 2022; pp. 10; International Searching Authority.

* cited by examiner

*100*

| PROVIDE OPTICAL FIBERS IN ADJACENT ARRANGEMENT | 110 |

| APPLY COATING TO OPTICAL FIBERS | 120 |

| APPLY BONDS TO OPTICAL FIBERS AT BONDING REGIONS | 130 |

| SEPARATE CONTINUOUS LENGTHWISE COATINGS BETWEEN OPTICAL FIBERS | 140 |

INTERMITTENTLY BONDED RIBBON WITH CONTINUOUS LENGTHWISE COATING

CROSS-REFERENCE TO RELATED APPLICATIONS

This application is a continuation of International Application No. PCT/US2021/058709 filed Nov. 10, 2021, which claims the benefit of priority of U.S. Provisional Application Ser. No. 63/115,780 filed on Nov. 19, 2020, the content of which is relied upon and incorporated herein by reference in its entirety.

BACKGROUND

The disclosure relates generally to optical fibers, and specifically to optical fiber ribbons in which the optical fibers are intermittently bonded together along the length of the optical fiber ribbon. A single optical fiber cable may contain many optical fibers (indeed, hundreds of optical fibers), and during installation of a fiber optic cable network, managing the connections between the optical fibers can be difficult. Thus, various portions of the optical fiber cable, such as individual optical fibers, buffer tubes, or ribbons, may be color coded for the purposes of identification when making such connections. Further, the optical fiber cable may contain optical fibers arranged in ribbons to allow for multiple optical fibers to be fusion spliced together in a single operation.

SUMMARY

Embodiments of the disclosure relate to an optical fiber ribbon. The optical fiber ribbon includes a plurality of optical fibers arranged adjacently to each other. Each optical fiber has a circumferential outer surface. The optical fiber ribbon also includes a lengthwise continuous coating disposed on at least a portion of the circumferential outer surface of each optical fiber of the plurality of optical fibers. The lengthwise continuous coating includes a colorant for identifying the optical fiber ribbon among a plurality of optical fiber ribbons. The lengthwise continuous coating has a first thickness as measured radially from the circumferential outer surface. Further, the optical fiber ribbon includes plurality of bonds intermittently formed between adjacent optical fibers of the plurality of optical fibers. Each of the plurality of bonds has a second thickness as measured radially from the circumferential outer surface. The second thickness is greater than the first thickness. The plurality of bonds provide the only connection between the adjacent optical fibers of the plurality of optical fibers.

Additional embodiments of the disclosure relate to a method of preparing an optical fiber ribbon. In the method, a plurality of optical fibers are arranged adjacent to each other along a length of the optical fiber ribbon. A lengthwise continuous coating including colorant is applied to at least a portion of each outer surface of the plurality of optical fibers. A plurality of bonds is intermittently applied between adjacent optical fibers of the plurality of optical fibers. The lengthwise continuous coatings of adjacent optical fibers are separated such that the plurality of bonds provides the only connection between the adjacent optical fibers of the plurality of optical fibers.

Further embodiments of the disclosure relate to an optical fiber ribbon. The optical fiber ribbon includes a plurality of optical fibers. Each optical fiber of the plurality of optical fibers includes a continuous lengthwise coating, and each optical fiber of the plurality of optical fibers is only intermittently bonded to an adjacent optical fiber of the plurality of optical fibers along a length of the optical fiber ribbon. The plurality of optical fibers define a first longitudinal cross-sectional configuration in which the plurality of optical fibers are substantially planar, and the plurality of optical fibers define a second longitudinal cross-sectional configuration in which the plurality of optical fibers are curled.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Referring generally to the figures, various embodiments of an optical fiber ribbon having intermittent bonding regions as well as methods for producing such an optical fiber ribbon are provided. As described herein, the optical fiber ribbons according to the present disclosure are flexible such that the ribbons can be rolled, curled, or folded from the planar configuration conventionally associated with fiber ribbons to a more space-saving configuration. In this way, the ribbons can be carried in cables having smaller diameters, and/or the cables can have a higher fill ratio (i.e., fraction of cross-sectional area filled with optical fibers). In addition to the intermittent bonds between the optical fiber ribbons, the fibers are provided with a continuous lengthwise coating (of the same or different material as the bonding material) containing a colorant that allows for identification of the ribbon. The lengthwise coating does not bond the optical fibers together along their length, and between the intermittent bonds, the optical fibers are not connected to one another. In particular embodiments, the lengthwise coating mechanically degrades (e.g., cohesively fails) between the optical fibers or the connection between the coatings of adjacent fibers is thermally or mechanically separated during processing to allow for the enhanced movement capability. Each of these exemplary embodiments will be described in greater detail below, and these exemplary embodiments are provided by way of illustration, and not by way of limitation. These and other aspects and advantages will be discussed in relation to the embodiments provided herein.

Figure 1:
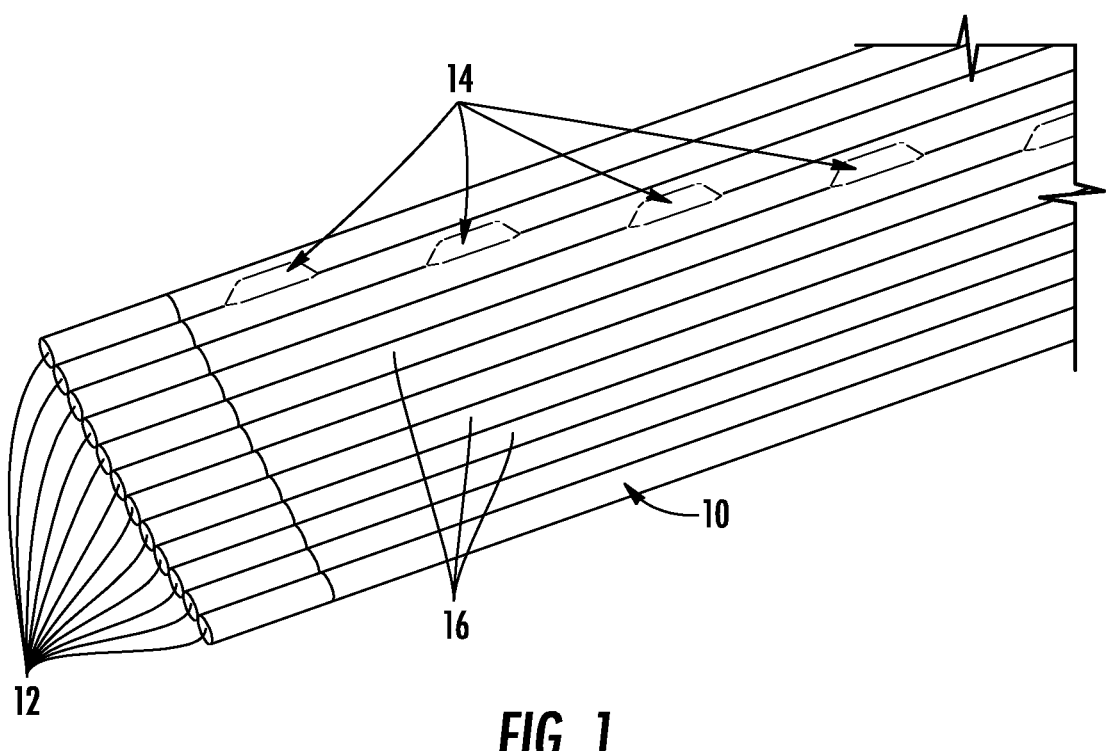
FIG. 1 is partial, perspective view of an intermittently bonded optical fiber ribbon, according to an exemplary embodiment.

FIG. 1 depicts an exemplary embodiment of an optical fiber ribbon 10. The optical fiber ribbon 10 includes a plurality of optical fibers 12. In the embodiment depicted, the optical fiber ribbon 10 includes twelve optical fibers 12. In embodiments, the number of optical fibers 12 contained in the optical fiber ribbon 10 varies from, e.g., four to thirty-six. Additionally, in embodiments, the optical fibers 12 may include an outer ink layer (not shown), which may further allow for arrangement of the optical fibers 12 in a color-coded pattern. For example, one convention for color-coding the optical fibers 12 is to arrange them in the following color sequence: blue, orange, green, brown, slate, white, red, black, yellow, violet, rose, and aqua (going from upper left to lower right with respect to the orientation of FIG. 1). In embodiments containing more than twelve optical fibers 12, the pattern of colors may be repeated. The optical fibers 12 are color coded in this way to help organize and identify specific fibers 12 when making connections or splices.

In embodiments, the optical fiber ribbon 10 has a first configuration in which the optical fibers 12 are arranged in a substantially planar row, which helps to organize the optical fibers 12 for mass fusion splicing. Further, as will be described more fully below, the optical fibers 12 also can be rolled, curled, or folded into a non-planar configuration (e.g., a circle or spiral) for space-saving packaging in an optical fiber cable, especially optical fiber cables having a circular cross-section. The optical fibers 12 of the optical fiber ribbon 10 are able to transition from the first configuration to the second configuration because the optical fibers 12 are only held together intermittently along the length of the optical fiber ribbon 10 by a plurality of intermittent bonds 14.

In a conventional optical fiber ribbon, the optical fibers are bonded to each other along their entire length to hold them in the planar configuration. According to the present disclosure, however, the optical fibers 12 are bonded inter-mittently along the length of the optical fiber ribbon 10 so that the optical fibers 12 are not rigidly held in the planar configuration. In between the intermittent bonding regions 14, the optical fibers 12 are not bonded to each other along their length. In this way, the present optical fiber ribbon 10 provides the advantages of a ribbon with respect to fiber organization and mass fusion splicing while also allowing for a more compact cable design.

FIG. 1 depicts the intermittent bonds 14 staggered along the length of the optical fibers 12. As shown in FIG. 1, the intermittent bonds 14 are thick regions of a continuous lengthwise coating 16 along the optical fibers 12. That is, the bonds 14 and continuous lengthwise coatings 16 may be made of the same material. Further, in embodiments, the bonds 14 and the coatings 16 may be applied simultaneously or nearly simultaneously. In other embodiments, the bonds 14 may be applied before or after the coatings 16 and may be made of a different material. These embodiments will be described in greater detail below.

Conventional optical fiber coatings are designed to continuously hold the optical fibers in a planar arrangement. However, the coating 16 of the presently disclosed optical fiber ribbon 10 is not mechanically robust and is deliberately separated in the interstices between optical fibers 12 such that the coating 16 does not continuously bond the optical fibers 12 to each other outside of the thicker intermittent bond regions 14. In this way, the coating 16 provides ribbon identification while also allowing flexibility for the ribbon to be bent, curled, or rolled.

Figure 2:
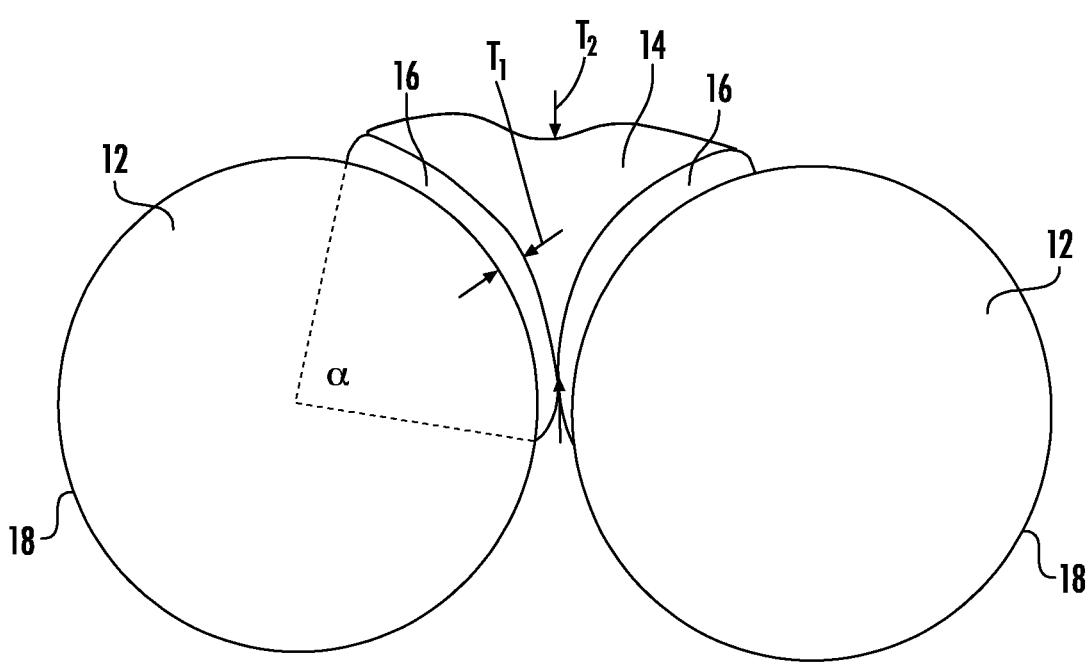
FIG. 2 depicts a longitudinal cross-sectional view of a bond between two optical fibers of the intermittently bonded optical fiber ribbon, according to another exemplary embodiment.

FIG. 2 depicts a longitudinal cross-sectional view of two adjacent optical fibers 12, each having a coating 16 and a bond formed therebetween. The optical fibers 12 have an outer surface 18 on which the coating 16 is applied. In embodiments, the coating 16 spans at least a portion of the circumference of the optical fiber 12. In embodiments, the coating 16 spans an angle $\alpha$ of at least 45° (and up to 360°) around the circumference of the optical fiber 12. In particular, the 45° of angle $\alpha$ is proximal to the fiber-to-fiber interface (i.e., interstice between fibers). FIG. 2 also shows a bond 14 located between the optical fibers 12. As will be discussed more fully below, the coating 16 is continuously applied along the lengths of the optical fibers 12 whereas the bond 14 is applied in a dropwise fashion at particular locations along the length. Further, the coating 16 is applied, modified, or made such that the coatings 16 of adjacent optical fibers 12 are not joined. However, while the coatings 16 and bond 14 between the optical fibers 12 appear to be discrete layers of material, the coatings 16 and bond 14 may be applied (as will be described below) such that there is no interface nor a mixed interface between the materials of the coatings 16 and bond 14.

Figure 3:
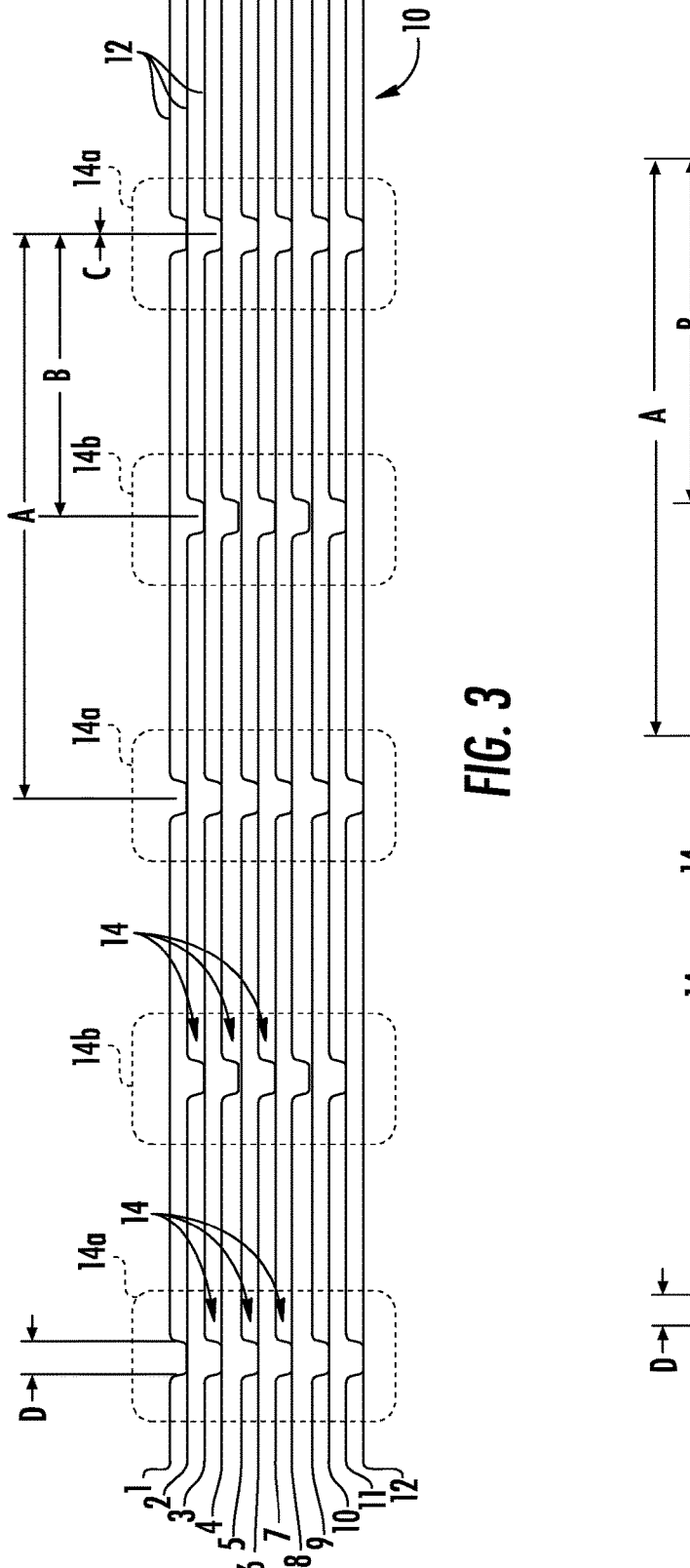
FIG. 3 depicts an exemplary pattern for bonding regions of the optical fiber ribbon, according to an exemplary embodiment.
Figure 4:
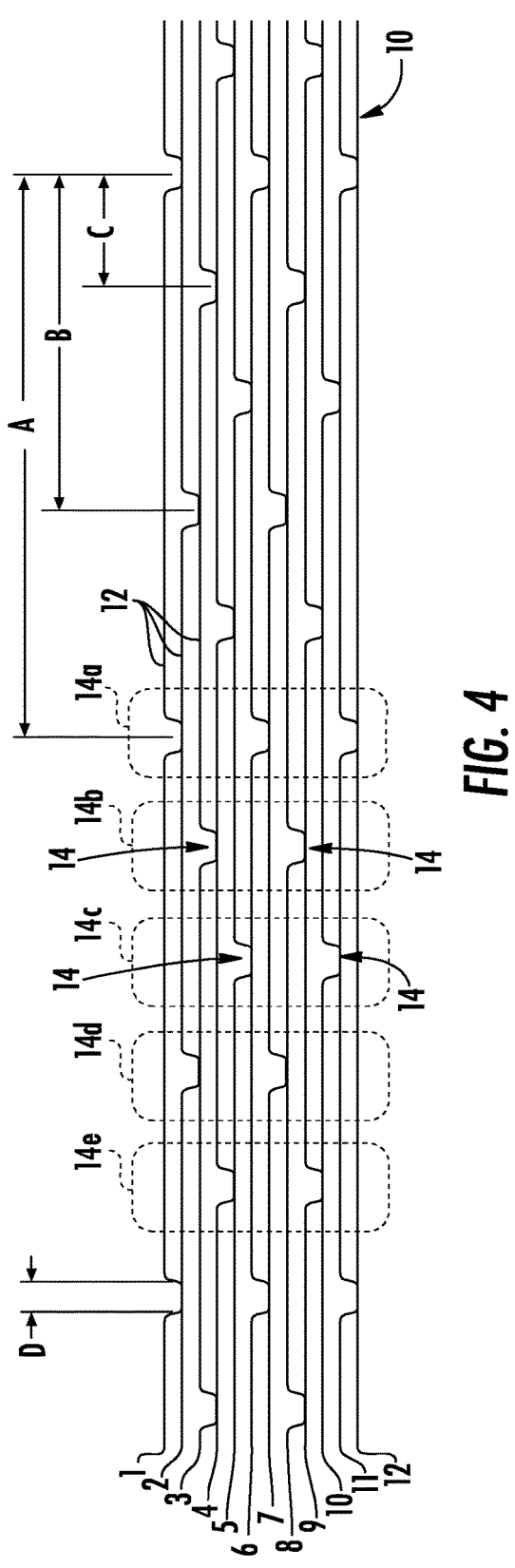
FIG. 4 depicts another exemplary pattern for bonding regions of the optical fiber ribbon, according to an exemplary embodiment.

FIGS. 3 and 4 provide example bonding patterns for bonds 14 between optical fibers 12 of the intermittent bonding regions 14. For the purposes of describing the bonding patterns in FIGS. 3 and 4, the optical fibers are numbered 1-12 (going from top to bottom with respect to the orientation of those figures). For additional reference, the bonds between pairs of optical fibers are referred to as odd or even. For example, in the embodiments depicted, there are twelve optical fibers and eleven bonds between the optical fibers. As shown, the odd bonds are the first (between optical fibers 1-2), third (3-4), fifth (5-6), seventh (7-8), ninth (9-10), and eleventh (11-12) pairs of optical fibers. The even bonds are the second (2-3), fourth, (4-5), sixth (6-7), eighth (8-9), and tenth (10-11) pairs of optical fibers. The number of bonds varies based on the number of optical fibers. In particular, the number of bonds between optical fibers is one less than the number of optical fibers.

FIG. 3 depicts an embodiment in which the bonds 14 are provided in an alternating pattern of bonding regions 14a, 14b that are substantially evenly spaced between each other as discussed below. In the first bonding region 14a, the following odd pairs of optical fibers 12 are bonded to each other: 1-2, 3-4, 5-6, 7-8, 9-10, and 11-12. In the second bonding region 14b, the even pairs of optical fibers 12 are bonded to each other: 2-3, 4-5, 6-7, 8-9, and 10-11.

FIG. 4 depicts an embodiment in which the bonds 14 are staggered along the length of the optical fibers 12. For comparison, FIG. 1 depicts a bonding pattern in which only one bond 14 is provided in each bonding region of the optical fiber ribbon 10. In FIG. 4, though, there are multiple bonds 14 in each bonding region. Specifically, the bonds 14 between optical fibers 12 are provided in a repeating pattern. In a first bonding region 14a, the following optical fibers 12 are bonded to each other: 1-2, 6-7, and 11-12. In a second bonding region 14b, the following optical fibers 12 are bonded to each other: 3-4 and 8-9. In a third bonding region 14c, the following optical fibers 12 are bonded to each other: 5-6 and 10-11. In a fourth bonding region 14d, the following optical fibers 12 are bonded to each other: 2-3 and 7-8. In a fifth bonding region 14e, the following optical fibers 12 are bonded to each other: 4-5 and 9-10. The pattern of bonding regions 14 is repeated (14a, 14b, 14c, 14d, 14e) along the length of the optical fiber ribbon 10. Within one period of the repeating pattern, each optical fiber 12 is bonded to its one (in the case of edge fibers) or two adjacent optical fibers 12.

FIGS. 3 and 4 represent intermittent bonds 14 made between optical fibers 12. The bonds 14 are provided in repeating patterns of bonding regions. FIG. 3 depicts alternating bonding regions 14a, 14b, and FIG. 4 depicts a pattern of five repeating bonding regions 14a-14e. In embodiments, the bonding regions may have as few as one bond 14 between two optical fibers 12 or as many bonds 14 as the number of optical fibers 12 divided by two (e.g., up to six bonds in a bonding region for twelve optical fibers 12, such as shown in bonding region 14a of FIG. 3). In other embodiments, the bonding regions may have as many bonds as necessary to join each optical fiber 12 to its adjacent optical fiber or fibers 12 at the same longitudinal location (e.g., eleven bonds 14 to join twelve optical fibers 12).

As can be seen in FIGS. 3 and 4, the spacing between bonding regions is denoted by intervals A, B, and C. Interval A is the spacing between repeating elements, such as the spacing between a bonding region 14a and the next bonding region 14a. In embodiments, interval A is from 20 mm to 100 mm. Interval B is the spacing between adjacent even and odd bonds, such as the distance between the bond 1-2 and bond 2-3. In FIG. 3, interval B is the midpoint of interval A, i.e., B=0.5A, which is 10 mm to 50 mm in embodiments, because the even and odd bonds are alternated. In FIG. 4, interval B is the midpoint of interval A as shifted by interval C, and interval C is the distance between even bonds or odd bonds (e.g., distance between bond 1-2 and bond 3-4 or between bond 2-3 and bond 4-5). In embodiments, interval C is from 0 mm to 20 mm. In FIG. 3, interval C is 0 mm because all the odd bonds are in the same bonding region 14a and all the even bonds are in the same bonding region 14b. Thus, in the bonding pattern of FIG. 3, interval B is at the midpoint of interval A (B=0.5A). In FIG. 4, interval C is not 0 mm, and the bonding pattern is created by shifting each successive odd or even bond by interval C. Thus, the odd and even bonds form a stepped pattern across the bonding regions 14a-14e. In this way, interval B becomes shifted from the midpoint of interval A by interval C (B=0.5A+C). In embodiments, interval B is from 0.5A to 0.75A when taking into account shifting by interval C. FIGS. 3 and 4 also depict a dimension D, which is the length of each bond 14. In embodiments, the length D is from 1 mm to 10 mm.

Figure 5:
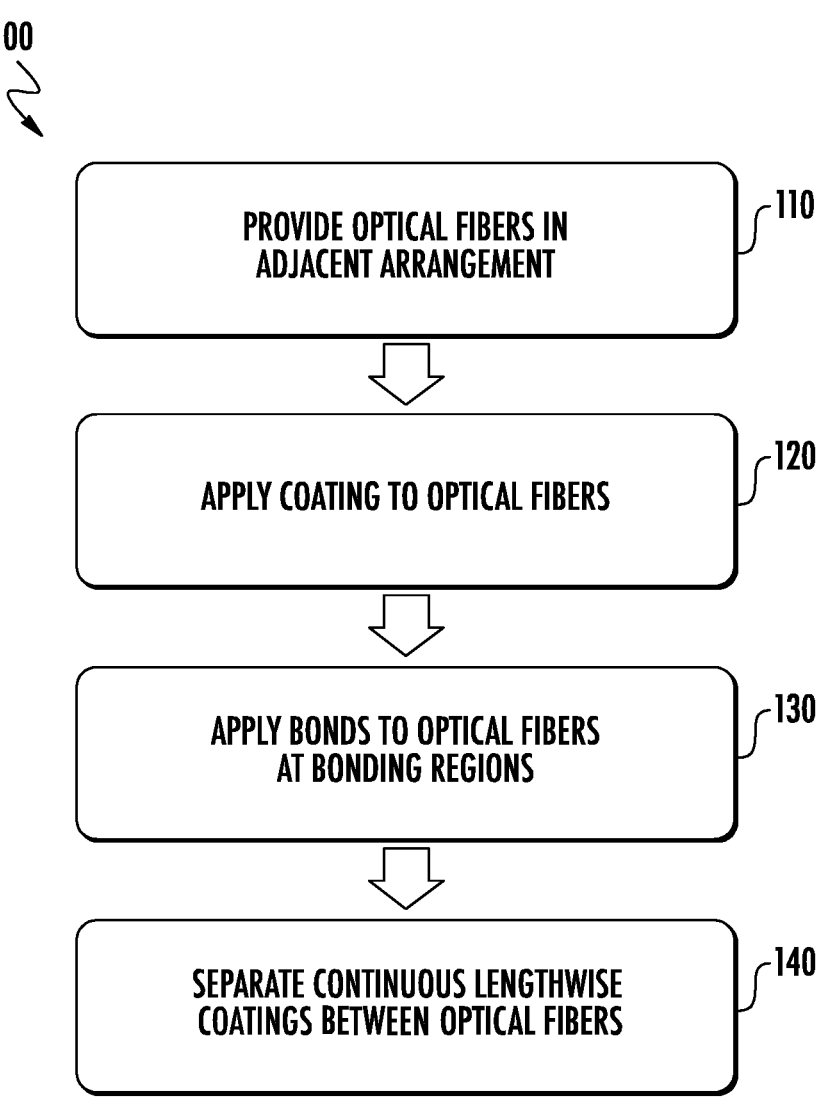
FIG. 5 depicts a flow diagram for a method of preparing an intermittently bonded optical fiber ribbon, according to a further exemplary embodiment.

FIG. 5 depicts a process flow diagram for a method 100 for preparing an optical fiber ribbon 10 according to the present disclosure. In a first step 110, the optical fibers 12 are arranged adjacent to each other. For the purposes of processing and deposition of the coating 16 and bonds 14, the optical fibers 12 may be arranged planarly. In a second step 120, the optical fibers 12 are moved through a continuous applicator (not shown) that applies the material for the coating 16. In an embodiment, the material for the coating 16 is a curable formulation (e.g., UV-curable formulation) comprising one or more urethane acrylate oligomers, one or more acrylate monomers, one or more photoinitiators, an antioxidant, and other typical processing additives. Further, when used as the coating 16, this material will also contain a colorant for the purposes of ribbon identification. In embodiments, the material of the coating 16 has a Young's modulus from 1 MPa to 50 MPa, an elongation at break greater than 200%, and/or a viscosity lower than 8000 cP at 25° C. Further, in embodiments, the material of the coating 16 has a glass transition temperature from −40° C. to 50° C. Such a material for the coating 16 would be considered to have relatively high toughness, e.g., as compared to the material discussed below for the bonds 14. The coating 16 is applied in a continuous manner so as to provide a lengthwise continuous coating 16 along at least a portion of the circumference of each optical fiber 12. In embodiments, the coating 16 is applied in such a way that the coating 16 has a thickness $T_1$ (as shown in FIG. 2) outside of the bond 14 areas from 1 μm to 20 μm, in particular from 1 μm to 10 μm.

While the application of the coating 16 is described as occurring first and the application of bonds 14 is referred to as a third step 130, the bonds 14 could be formed before, during (simultaneously or nearly simultaneously), or after application of the continuous lengthwise coating 16. For example, in embodiments, the bonds 14 can be made between optical fibers 12 at specified bonding regions in a dropwise manner (e.g., using continuous inkjet printing) before or after application of the coating 16. Further, in embodiments, the bonds 14 can be made during application of the coating 16 by changing the outlet profile of the ribbon coating tool during ribbon coating. In embodiments, the bonds 14 are applied in such a way that the bond 14 have a thickness $T_2$ (FIG. 2) of at least 10 μm as measured normal to a longitudinal axis between adjacent optical fibers 12. In embodiments, the outer surface 18 of the optical fibers 12 defines an outer diameter of the optical fibers 12, and the thickness $T_2$ of the bonds 14 is up to 60% of the outer diameter.

In general, simultaneous application of the bonds 14 will involve using the same material for the bonds 14 and the coating 16, and thus, the composition described above is also suitable as the material for the bonds 14. Further, when the same material is used for both the bonds 14 and the coating 16, the greater thickness of the material in the bonds 14 provides the mechanical robustness necessary to hold the optical fibers 12 together in the bonding regions.

In embodiments in which the bonds 14 and coating 16 are not applied simultaneously or nearly simultaneously, the bonds 14 may be applied to the coating 16 while the coating 16 is still wet or not fully cured, or vice versa, so that the material of the bonds 14 and the material of the coating 16 can intermix at the application interface. As mentioned above, steps 120 and 130 of applying the coating 16 and the bonds 14 may be reversed or occur simultaneously or nearly simultaneously.

In an embodiment, the material for the bonds 14 is a low-friction material to allow sliding of the ribbons 10. In an embodiment, the material of the bonds is a curable formulation (e.g., UV-curable formulation) comprising one or more urethane acrylate oligomers, one or more acrylate monomers, one or more photoinitiators, an antioxidant, and other typical processing additives. In embodiments, the material for the bonds 14 has a Young's modulus from 100 MPa to 1500 MPa, an elongation at break from 20% to 200%, and/or a viscosity lower than 30000 cP at 25° C. Further, in embodiments, the material for the bonds 14 has a glass transition temperature from 0° C. to 100° C. The same material used for the bonds 14 could also be the same material used for the coating 16, and the material described above for the coating 16 may also be used for the bonds 14. For example, the material applied first to the optical fibers (and thus inner material) may be the high toughness material, and the material applied second (and thus outer material) may be the low friction material.

After the coating 16 and bonds 14 are applied to the optical fibers 12, any connection between adjacent coatings 16 is broken in fourth step 140. In embodiments, the connection between coatings 16 can be broken mechanically by creating a cohesive failure at the joint between the coatings 16, e.g., by stretching or pulling on the fibers 12. In other embodiments, a mechanical shear stress can be applied to rupture the coatings 16 between the fibers 12. In still another embodiment, laser radiation can be used to ablate a continuous or discontinuous incision at the joint between the coatings 16 of adjacent fibers 12. For example, a laser beam and beam splitting optics can be used to direct laser radiation to interstices between optical fibers 12 to ablate the coating 16. In still another embodiment, a fluid jet can be used to rupture the coatings 16 between adjacent fibers 12. By rupturing the coatings 16, as necessary, between the optical fibers 12, the optical fibers 12 are able to bend and roll from the planar configuration to a more compact configuration to reduce the size of the optical fiber cable needed to carry the ribbon 10.

Figure 6:
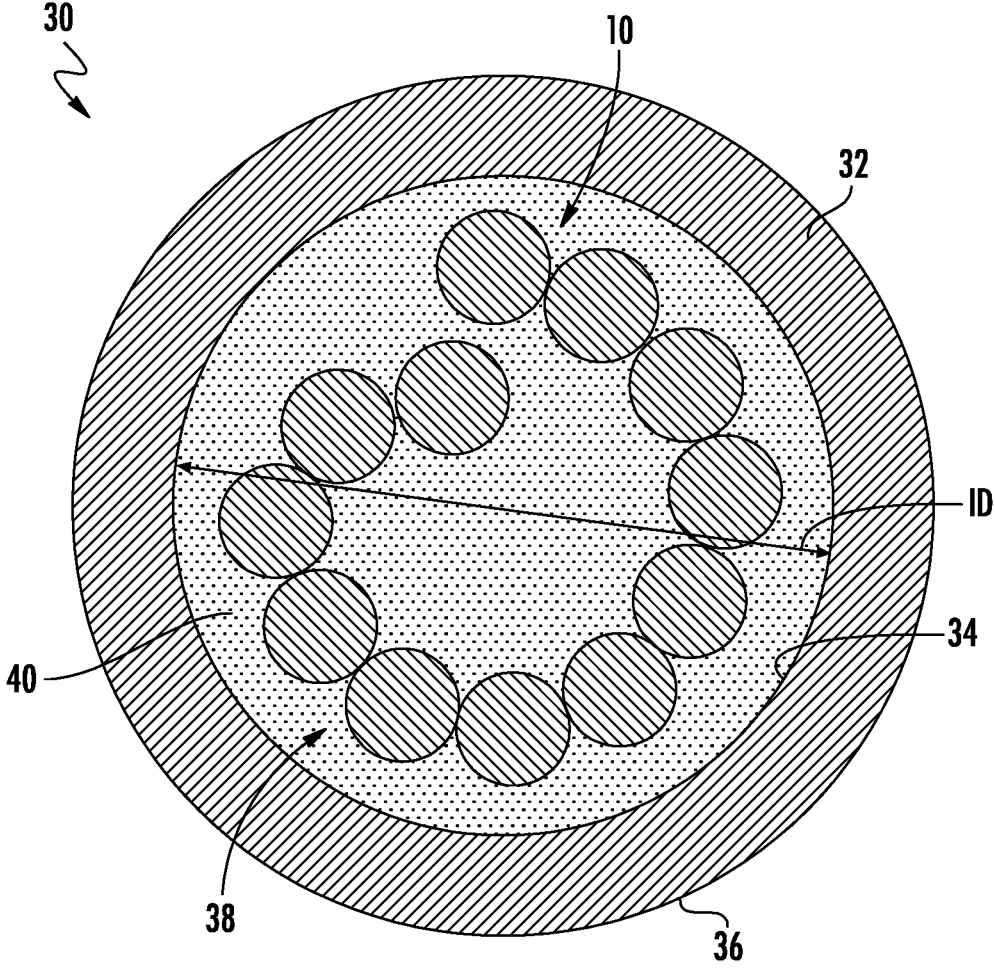
FIG. 6 depicts a longitudinal cross-section of an optical fiber cable including an intermittently bonded optical fiber ribbon, according to an exemplary embodiment.

As mentioned above, the intermittently bonded optical fiber ribbon 10 allows for smaller cable diameters and/or higher fill ratios. FIG. 6 depicts an embodiment of an optical fiber cable 30 containing an intermittently bonded optical fiber ribbon 10. The optical fiber cable 30 has a cable jacket 32 with an inner surface 34 and an outer surface 36. In embodiments, the outer surface 36 is the outermost surface of the optical fiber cable 30. The inner surface 34 defines a central bore 38 containing the optical fiber ribbon 10. The central bore 38 has a diameter, which is the inner diameter ID of the cable jacket 32. As shown in FIG. 6, the central bore 38 is also filled with filling material 40, which may include strength members (such as aramid, cotton, basalt, and/or glass yarns), water blocking gels or powders, and/or fire retardant materials, among others.

Conventionally, the inner diameter of the cable jacket had to be at least as large as the width of the optical fiber ribbon in the planar configuration in order to accommodate the entire optical fiber ribbon. However, this meant that much of the interior space of the optical fiber jacket went unfilled. According to the present disclosure, smaller cable diameters and/or higher fill ratios are achievable by reducing the maximum cross-sectional dimension of the optical fiber ribbon 10. In particular, by rolling or curling the optical fiber ribbon 10 into, e.g., a circle or spiral, the inner diameter ID of the cable 30 can be smaller, providing an overall smaller and more highly filled cable design. Notwithstanding, the optical fiber ribbon 10 can still be removed from the optical fiber cable 30, flattened into the planar configuration, and then easily be mass fusion spliced like a conventional optical fiber ribbon. For the sake of simplicity, a single optical fiber ribbon 10 was shown in the optical fiber cable 30. However, in alternate embodiments, the optical fiber cable 30 may contain several tens or hundreds of optical fiber ribbons 10. Further, such optical fiber ribbons 10 may be arranged in one or more buffer tubes within the central bore 38 of the cable jacket 32.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber ribbon, comprising:
   a plurality of optical fibers arranged adjacently to each other, wherein each optical fiber comprises a respective colorant layer that forms a circumferential outer surface of the optical fiber, the respective colorant layer serving to identify each of the optical fibers from among the other optical fibers in the plurality of optical fibers;
   a continuous lengthwise coating disposed on at least a portion of the circumferential outer surface of each optical fiber of the plurality of optical fibers, wherein the continuous lengthwise coating comprises a colorant for identifying the optical fiber ribbon among a plurality of optical fiber ribbons and wherein the continuous lengthwise coating comprises a first thickness as measured radially from the circumferential outer surface;
   a plurality of bonds intermittently formed between adjacent optical fibers of the plurality of optical fibers, wherein each of the plurality of bonds comprises a second thickness when measured normal to a longitudinal axis between the adjacent optical fibers, the second thickness being greater than the first thickness;
   wherein the plurality of bonds provide the only connection between the adjacent optical fibers of the plurality of optical fibers.

2. The optical fiber ribbon of claim 1, wherein the at least the portion of the circumferential outer surface is at least 45° of the circumferential outer surface.

3. The optical fiber ribbon of claim 1, wherein the continuous lengthwise coatings and the plurality of bonds are formed of a same material.

4. The optical fiber ribbon of claim 1, wherein the continuous lengthwise coatings and the plurality of bonds are formed of different materials.

5. The optical fiber ribbon of claim 4, wherein an interface of the different materials of the continuous lengthwise coatings and the plurality of bonds is intermixed.

6. The optical fiber ribbon of claim 1, wherein bonds of the plurality of bonds formed between a same pair of adjacent optical fibers are separated by an interval of 20 mm to 100 mm.

7. The optical fiber ribbon of claim 1, wherein the first thickness is from 1 μm to 20 μm.

8. The optical fiber ribbon of claim 1, wherein the second thickness is at least 10 μm.

9. The optical fiber ribbon of claim 8, wherein the circumferential outer surface of each optical fiber defines an outer diameter of each optical fiber and wherein the second thickness is up to 60% of the outer diameter.

10. The optical fiber ribbon of claim 1, wherein the continuous lengthwise coating comprises a same colorant for all of the plurality of optical fibers in the optical fiber ribbon.

11. An optical fiber ribbon, comprising:

a plurality of optical fibers arranged adjacently to each other, wherein each optical fiber comprises a circumferential outer surface;

a continuous lengthwise coating disposed on at least a portion of the circumferential outer surface of each optical fiber of the plurality of optical fibers, wherein the continuous lengthwise coating comprises a colorant for identifying the optical fiber ribbon among a plurality of optical fiber ribbons and wherein the continuous lengthwise coating comprises a first thickness as measured radially from the circumferential outer surface;

a plurality of bonds intermittently formed between adjacent optical fibers of the plurality of optical fibers, wherein each of the plurality of bonds comprises a second thickness when measured normal to a longitudinal axis between the adjacent optical fibers, the second thickness being greater than the first thickness;

wherein the plurality of bonds provide the only connection between the adjacent optical fibers of the plurality of optical fibers;

wherein the continuous lengthwise coatings and the plurality of bonds are formed of different materials; and wherein one of the continuous lengthwise coatings or the plurality of bonds comprises one or more urethane acrylate oligomers, one or more acrylate monomers, one or more photoinitiators, and an antioxidant and comprises at least one of a Young's modulus from 100 MPa to 1500 MPa or an elongation at break from 20% to 200%.

12. The optical fiber ribbon of claim 11, wherein the other of the continuous lengthwise coatings or the plurality of bonds comprises one or more urethane acrylate oligomers, one or more acrylate monomers, one or more photoinitiators, and an antioxidant and comprises at least one of a Young's modulus from 1 MPa to 50 MPa or an elongation at break greater than 200%.

13. A method of preparing an optical fiber ribbon, comprising:

arranging a plurality of optical fibers adjacent to each other along a length of the optical fiber ribbon, wherein each of the plurality of optical fibers comprises a respective colorant layer that forms an outer surface of the optical fiber;

applying a lengthwise continuous coating comprising colorant to at least a portion of each outer surface of the plurality of optical fibers;

intermittently applying a plurality of bonds between adjacent optical fibers of the plurality of optical fibers;

separating the lengthwise continuous coatings of adjacent optical fibers such that the plurality of bonds provides the only connection between the adjacent optical fibers of the plurality of optical fibers.

14. The method of claim 13, wherein the step of separating comprises applying a mechanical stress to the plurality of optical fibers to break connections between the lengthwise continuous coatings.

15. The method of claim 13, wherein the step of separating comprises radiating regions between adjacent optical fibers with a laser to ablate connections between the lengthwise continuous coatings.

16. The method of claim 13, wherein the step of separating comprises directing a fluid jet between adjacent optical fibers to break connections between the lengthwise continuous coatings.

17. The method of claim 13, wherein the steps of applying the lengthwise continuous coating and intermittently applying the plurality of bonds occur simultaneously.

18. The method of claim 17, wherein the lengthwise continuous coatings and the plurality of bonds comprise a same material.

19. The method of claim 17, wherein the step of applying the lengthwise continuous coating occurs before or after the step of intermittently applying the plurality of bonds.

20. The method of claim 19, wherein the step of applying the lengthwise continuous coating occurs in an application with a ribbon coating tool.

21. The method of claim 20, wherein the step of intermittently applying the plurality of bonds comprises dropwise applying the plurality of bonds using a continuous inkjet printer.

* * * * *